United States Patent Office 3,005,756
Patented Oct. 24, 1961

3,005,756
DILUTER CONTAINING CARBON DIOXIDE
FOR PRESERVING SEMEN
Noland L. Van Demark, Champaign, and Glenn W. Salisbury, Urbana, Ill., assignors to the University of Illinois Foundation
No Drawing. Filed Nov. 14, 1958, Ser. No. 773,822
15 Claims. (Cl. 167—74)

This invention relates to a process for preserving the motility and fertility of semen and the resulting product.

This application is a continuation-in-part application of United States patent application Serial No. 647,982 filed March 25, 1957, now abandoned.

The invention has particular reference to processes and products involved in the artificial breeding of cattle. In practicing artificial insemination, it has heretofore been the practice either to utilize the semen promptly or to dilute it with a nutrient medium and store at 41° F. or freeze it by special processing and maintain it at −110° F. Storage of the semen at 41° F. results in a rapid loss of fertility. The freezing will preserve fertility for several months, but unless the temperature is constantly maintained as low as −110° F., the product is spoiled. The cost of the freezing operation is considerable and is, in fact, prohibitive in a large part of the industry due to the lack of freezing facilities. However, a more serious drawback is the fact that the freezing itself destroys 10 to 50% of the spermatozoa and also the fact that it is impossible to detect, in advance of use, a possible destruction of the fertility of the product due to temporary warming of the product during storage. In other words, if freezing is interrupted even for a short time, the fertility of the semen may be destroyed even though at the time of inspection the product is at the proper temperature.

The present invention provides a very simple system for maintaining fertility under varying storage temperature conditions. It is especially useful for preserving semen under ordinary room temperature storage for at least several days which facilitates the increased use of artificial insemination, especially in areas where refrigeration is not available.

It has been found that carbon dioxide incorporated into an aqueous nutrient solution which is buffered to produce and maintain a pH above 5.5 and preferably within the pH range natural for semen, viz. from about 6.1 to 7.5, produces a semen diluent which extends the viability and fertility of the semen over a longer period than is obtained by the use of commonly used diluents. The diluted semen is stored in hermetically sealed containers with care being taken to avoid the escape of $CO_2$ before, during, and after filling the containers. Standard practices are used in making inseminations with the diluted semen. Generally a reduction of the $CO_2$ content of the diluter, which effects a reversibility of the inhibition of spermatozoan motility, will occur upon opening the storage container in normal use of the diluted semen in insemination.

To illustrate the beneficial effects of the instant invention, motility investigations were carried out in which the bovine semen was diluted employing a control diluent and a diluent formulated in accordance with this invention. The control diluent, herein referred to as EYC diluter, consisted of one part egg yolk and three parts of a 2.9% solution of sodium citrate dihydrate to which was added 3 mg. sulfanilamide, 1,000 μg. dihydrostreptomycin sulfate and 1,000 I.U. penicillin G per ml. of diluent. The test diluent was prepared in accordance with the instant invention by dissolving 20.0 gm. sodium citrate dihydrate, 2.1 gm. sodium bicarbonate, 0.4 gm. potassium chloride, 3.0 gm. glucose and 3.0 gm. sulfanilamide in a liter of distilled water heated to near the boiling temperature. The solution was then cooled to room temperature and was saturated with $CO_2$ by bubbling the gas through it for ten minutes (or until the pH was reduced to about 6.35). After saturation with $CO_2$, 1,000 I.U. penicillin and 1,000 μg. dihydrostreptomycin sulfate per ml. were added along with sufficient fresh egg yolk to make a final diluent consisting of 10% egg yolk. This diluent is called the Illini Variable Temperature (IVT) diluter.

Ejaculates of bovine semen were collected and sufficient amounts incorporated in the diluents so that each milliliter of diluent employed contained a minimum of 20 million sperm. Samples of diluted semen in 1 ml. quantities were sealed in glass ampules (2.2 ml. total capacity) and stored under various storage conditions hereinafter described.

In carrying out the motility studies 12 samples from 12 different bulls were split and one portion was diluted in EYC diluter and stored at 41° F. Another portion was diluted in IVT diluent and stored at room temperature (65° to 80° F.). The motility of the semen was determined at the time the semen samples were prepared and thereafter at intervals over a seven day period. In determining the motility of the semen samples the storage ampule was opened and the solution agitated. A glass rod was inserted into the diluted semen and a portion of the diluted semen transferred to a miscroscope viewing slide. The motility of the sperm was evaluated by microscopically determining the number of active cells within the given field on a percentage basis. The average results from the 12 samples are tabulated in Table I.

TABLE I

Comparative survival of bull sperm in the IVT diluent in ampules at room temperature and in EYC diluent at 41° F. (averages on ejaculates from 12 different bulls)

| Age, Days | Sperm Motility in— | |
|---|---|---|
| | IVT at Room Temp., Percent | EYC at 41° F., Percent |
| 1–2 | 68 | 66 |
| 2–3 | 64 | 58 |
| 3–4 | 63 | 51 |
| 4–5 | 58 | 45 |
| 5–6 | 56 | 35 |
| 6–7 | 54 | 26 |
| 7–8 | 50 | 18 |

As shown in Table I a high proportion of the spermatozoa remained motile over the period of the investigation when stored in IVT diluent at room temperature, whereas the percentage of motile sperm declined rapidly in the EYC diluent stored in the normal routine manner at 41° F.

In a further investigation of the effectiveness of the IVT diluent in preserving spermatozoan motility the composition of the IVT diluent was varied to contain 14.8 gm. sodium citrate dihydrate, 2.1 gm. sodium bicarbonate, 0.4 gm. potassium chloride, 12.0 gm. glucose, 3.0 gm. sulfanilamide and 0.1 gm. catalase per liter. After saturation with $CO_2$, 1,000 I.U. penicillin and 1,000 µg. dihydrostreptomycin sulfate per ml. were added along with sufficient fresh egg yolk to make a final diluent consisting of 15% egg yolk. Control samples were prepared by employing a second control diluent herein referred to as YM diluter, consisting of 15 parts egg youk, 15 parts of a 2.9% solution of sodium citrate dihydrate, and 70 parts of pasteurized skimmed milk to which was added 3 mg. sulfanilamide, 1,000 µg. dihydrostreptomycin sulfate and 1,000 I.U. penicillin G per ml. of diluent. The hereinbefore described EYC diluter was also employed as a control diluent.

In carrying out the motility studies one set of semen samples in the various diluents was stored under varying temperature conditions wherein the temperature was varied from 32° to 80° F. every twelve hours. Another set of semen samples was stored at a constant temperature of 80° F. The average percentage of motile spermatozoa was determined microscopically as described above employing four observations. The results of this investigation are summarized in Table II.

TABLE II

*Motility summary, percent motile*

| Days | Varied Temperature | | | 80° F. | | |
|---|---|---|---|---|---|---|
| | IVT | YM | EYC | IVT | YM | EYC |
| Initial | 70 | 70 | 65 | 70 | 70 | 65 |
| 1 | 65 | 55 | 31.5 | 67.5 | 28.75 | 38.75 |
| 2 | 55 | 17.5 | 24 | 65 | 15.5 | 37.5 |
| 3 | 45 | 3.25 | 10.25 | 65 | 1.5 | 33.75 |
| 4 | 45 | .25 | 2.5 | 62.5 | 0 | 36.25 |
| 7 | 22.75 | 0 | 0 | 60 | 0 | 25 |

As shown in Table II a substantial portion of the semen stored in the IVT diluter remained motile over the entire period of investigation of the semen stored under the varying temperature conditions whereas substantially all of the semen stored in the YM and EYC diluters were non-motile after three days. At the elevated temperature test in which the semen samples were stored at a temperature of 80° F. the motility of the semen preserved in the IVT diluter remained substantially unaffected whereas the semen in the YM diluter became substantially immotile after a two day storage period. Even though the semen stored in the EYC diluter manifested some motility at the end of the seven day period there were more than 200% more motile sperm in the IVT diluter than in the EYC diluter.

The above data demonstrate that semen can be stored at room temperatures for several days without a substantial loss in motility and that even under varying temperature conditions a substantial percentage of motile sperm remain in the IVT diluter under conditions having a severe deleterious effect on the motility of semen stored in diluters formulated in accordance with standard practices.

The effectiveness of the instant invention for the preservation of semen fertility was tested by comparing non-return-to-service rates of cows bred with IVT-diluted semen versus EYC-diluted semen, using a split ejaculate technique. The IVT diluter and EYC diluter were prepared as above described. Split ejaculates of semen from two Holstein bulls of the Northern Illinois Breeding Co-op were diluted with the IVT diluent, so that each ml. contained approximately 25 million sperm. One-ml. quantities of the diluted semen were sealed in glass ampules (2.2 ml. total capacity) and stored in the dark at room temperatures (65° to 80° F.). The semen diluted with EYC diluter was cooled and stored at 41° F. in accordance with standard practices. The diluted semen in IVT diluter and EYC diluter were used by technicians of the Co-op for routine inseminations and the data from the field trial are summarized in Table III.

TABLE III

*Comparative fertility of split ejaculates of two bulls when stored in the Illini Variable Temperature diluter (IVT) at room temperature and in EYC diluter at 41° F.*

| Age of Semen (days) | Semen in IVT Diluter at room temperature | | | Semen in EYC diluter at 41° F. | |
|---|---|---|---|---|---|
| | Cows Bred (No.) | 28–39 Day N.R.[1] (percent) | 60–90 Day N.R. (percent) | Cows Bred (No.) | 60–90 Day N.R. (percent) |
| 1–2 | 21 | 81.0 | 81.0 | 469 | 72.0 |
| 2–3 | 22 | 95.4 | 72.7 | 43 | 41.9 |
| 3–4 | 23 | 91.3 | 78.3 | 15 | 40.0 |
| 4–5 | 20 | 75.0 | 70.0 | 2 | 0 |
| 5–6 | 20 | 90.0 | 70.0 | 6 | 0 |
| 6–7 | 5 | 100.0 | 100.0 | | |
| Total | 111 | 87.4 | 75.7 | 535 | 66.9 |

[1] N.R.=nonreturn to service.

The data show that the fertility of the IVT-diluted semen did not decrease during 6 to 7 days storage at room temperature whereas the fertility of the EYC-diluted semen stored at low temperatures in accordance with standard practices diminished rapidly after 1 to 2 days storage and after four days storage was ineffective. In addition the overall nonreturn rate of 75.7% for the IVT-diluted semen was 9% higher than the return rate for the same ejaculates in EYC diluter even though the latter was only 1–3 days old when used.

In formulating the diluter conventional ingredients are employed in aqueous solutions to provide the desired amounts of salts, minerals and nutrients and obtain a diluter osmotic with semen plasma. Various nutrients such as egg yolk, skim milk, or blood-derived materials are used for energy purposes when the inhibitory effects of $CO_2$ are released. Other nutrients include various sugars such as glucose or fructose. Egg yolk is an important constituent and is included to provide diluters which are protected against cold shock. To buffer the diluter and maintain the diluter at the desired pH over the entire storage period a desired amount of a conventional non-toxic buffering agent is employed. Alkali metal bicarbonates are excellent buffering agents either alone or preferably in combination with an alkali metal citrate. The bicarbonate also supplies an additional source of $CO_2$, if the glycolytic activity of the cells is not completely inhibited. Under these conditions acid end products are formed which react with the bicarbonate to release $CO_2$. The citrate is included as a naturally occurring substance in semen which provides some buffering action. It is also a variable component which can be increased or decreased to hold osmotic pressure when changes are made in concentrations of the other components. Other buffers such as phosphates can be used with less effective results. To control diseases such as brucellosis, leptospirosis, and vibrosis organisms, antibacterial or antibiotic agents such as pencillin, streptomycin and sulfanilamide are employed. The use of sulfanilamide has the supplementary effect of inhibiting anaerobic glycosis brought about by high levels of $CO_2$ in $N_2$ thereby effecting a metabolic and bacterial control.

Other illustrative compositions prepared in accordance with this invention are shown in Table IV.

TABLE IV

[Composition of IVT in g./100 ml.]

| Ingredients | 4G–1B | 4G–4B |
|---|---|---|
| $NaHCO_3$ | 0.21 | 0.83 |
| Na Citrate | 1.48 | 0.09 |
| KCl | 0.04 | 0.04 |
| Glucose | 1.20 | 1.20 |
| Sulfanilamide | 0.30 | 0.30 |
| Catalase | 0.01 | 0.01 |
| Egg Yolk (percent) | 15 | 15 |
| Penicillin (IU/ml.) | 1,000 | 1,000 |
| Dihydrostreptomycin Sulfate (µg./ml.) | 1,000 | 1,000 |

To enhance the inhibitory effect of the $CO_2$ in the diluter of this invention it has also been found that the potassium ion content of the diluter is important. It is desirable therefore to provide a minimum level of potassium ion concentration in the diluter. Because other cations including sodium are generally included in an osmotically balanced diluter solution, the desired potassium content can be stated in terms of a sodium/potassium ratio. The desired molar concentrations can be provided by using potassium buffering agents to replace the sodium buffering agents employed in the hereinbefore described diluters or other water soluble potassium salts can be used as desired. For example, a high K diluent containing the same comparable levels of bicarbonate and glucose as in the above described IVT diluter, but in which the molar concentration of Na in the IVT diluter is exactly replaced by potassium and the original potassium level is replaced by sodium is given below:

| Constituents: | G/100 ml. |
|---|---|
| Potassium bicarbonate | 1.25 |
| Potassium citrate monohydrate | 2.21 |
| Sodium chloride | 0.03 |
| Glucose | 0.30 |
| Sulfanilamide | 0.30 |
| Penicillin IU/ml. | 1000 |
| Dihydrostreptomycin sulfate (g./ml.) | 1000 |

This diluent contains approximately 118 mg. Na/100ml. and 896 mg. K/100 ml. This is a ratio of 1 Na to 7.6 K; whereas the IVT contained 527 mg. Na/100 ml. and 21 mg. K/100 ml. This gives a Na/K ratio of about 25:1.

If sodium salts are to be included in the formulation, a weight ratio of potassium/sodium of not less than about 3:1 is preferred. It is to be understood, however, that excellent results can be obtained employing potassium/ sodium ratios lower than this ratio as shown above. If formulations are employed which do not include sodium salts sufficient potassium salts should be employed to provide a milliosmol concentration of potassium of not less than about 270. The maximum concentrations of potassium and/or sodium salts which are used is determined by the osmotic balance requirements of the storage diluent.

In employing the instant invention for the preservation of semen the buffered $CO_2$ containing nutrient solution is initially prepared and the semen collected directly in the diluter, although the semen can be collected and subsequently diluted with the diluent if desired. Generally the dilution should be completed within a few minutes after collection. Accordingly semen diluents prepared in accordance with this invention can be prepackaged in suitable hermetically sealed containers and stored until used to dilute the semen. Care must be taken in handling the diluent and diluted semen to avoid the escape of $CO_2$ especially before, during, and after filling the unit package ampules. Formulations in dry form can also be provided which include $CO_2$ generating substances which are activated by the addition of water. A composition of this type is as follows:

| Constituents | G/100 ml. |
|---|---|
| Potassium bicarbonate ($KHCO_3$) | 1.73 |
| Sodium bicarbonate ($NaHCO_3$) | 0.82 |
| Citric acid ($C_6H_8O_7.2H_2O$) | 1.82 |

This diluent is designed only for use in collection of semen directly into it. Water is added just before collection for it dissolves the citric acid which combines with the bicarbonates to release $CO_2$ gas which saturates the mixture. The diluent contains 675 mg./100 ml. of K and 220 mg./100 ml. of Na. It possesses a milliosmol concentration of approximately 290 about 10 to 15 minutes after mixing and about 270 after the $CO_2$ in the mixture is exhausted. Its Na/K ratio is 1:0.31.

This inhibitory diluent contains no substrate and thus should not be used as storage media if the $CO_2$ is permitted to escape.

A simpler mixture containing more K and no Na is 2.70 g. $KHCO_3$ and 1.899 g. $C_6H_8O_7.2H_2O$ made up with 100 ml. of water. This contains 1054.3 mg./100 ml. of K and a milliosmol concentration the same as the 3:1 K to Na inhibitor diluent mentioned above.

The reversal of motility inhibition and reactivation is generally brought about by aeration; however, reactivation can be effected by bringing other gases including helium, hydrogen, nitrogen, oxygen, and mixtures thereof in contact with the semen solution prepared in accordance with this invention.

Although the instant invention is illustrated by the foregoing specific embodiments, it is apparent that variations and modifications thereof will be suggested to those skilled in the art without departing from the scope of this invention. It is intended therefore that the instant invention be limited only in the manner set forth in the appended claims.

What is claimed is:

1. A diluter for preserving semen which comprises a buffered aqueous medium containing added carbon dioxide and having a pH within the range of from above 5.5 to about 7.5 and a buffering agent to maintain the diluter within said range.

2. A diluter in accordance with claim 1 which contains a nutrient for said semen.

3. A composition for preserving semen which comprises a $CO_2$ producing reagent and buffering agent to produce, when dissolved in water, an aqueous buffered solution containing $CO_2$ and having a pH within the range of from above 5.5 to about 7.5 and buffering agent to maintain the diluter within said range.

4. A diluter for preserving semen which comprises a buffered aqueous medium containing added carbon dioxide and having a pH within the range of from above 5.5 to about 7.5 and a buffering agent to retain the diluter within said range, a nutrient for said semen, and a water soluble potassium salt to provide a milliosmol concentration of not less than about 270.

5. An osmotically balanced diluter for preserving semen which comprises a buffered aqueous medium containing water soluble sodium salts, added carbon dioxide and having a pH within the range of from above 5.5 to about 7.5, a buffering agent to retain the diluter within said range, a nutrient for said semen, and a water soluble potassium salt to provide a weight ratio of sodium ion to potassium ion of not less than about 1:3.

6. An osmotically balanced diluter for preserving semen which comprises a buffered, aqueous medium saturated with $CO_2$ and having a pH within the range of about 6.1–7.5 and containing an alkali metal bicarbonate buffering agent in an amount sufficient to maintain the diluter within said range, and a nutrient for said semen.

7. A diluter in accordance with claim 6 which contains sufficient amounts of a water soluble potassium salt to provide a milliosmol concentration of potassium of not less than about 270.

8. A diluter in accordance with claim 6 in which said buffering agent includes an alkali metal citrate.

9. A diluter in accordance with claim 8 which contains an antibiotic agent to control bacterial action.

10. A diluter in accordance with claim 6 in which said nutrient comprises egg yolk and a hexose.

11. A diluter in accordance with claim 10 in which the antibiotic agent is a sulfanilamide.

12. An osmotically balanced diluter for semen consisting of an aqueous solution having the following composition:

(a) $CO_2$ in sufficient amounts to saturate said solution and provide a pH of about 6.1–7.5;

(b) An alkali metal bicarbonate buffering agent in an amount sufficient to maintain said pH;

(c) An alkali metal citrate;

(d) An antibiotic comprising sulfanilamide and penicillin; and (e) A nutrient for said semen comprising egg yolk and a hexose.

13. A composition in accordance with claim 12 in which at least one of the alkali metal salts is a potassium salt and the milliosmol concentration of potassium in said diluter is not less than about 270.

14. A composition in accordance with claim 12 which contains a sodium salt and at least one of the alkali metal salts is a potassium salt and the weight ratio of potassium to sodium is not less than about 3:1.

15. A diluter for preserving semen which comprises a buffered aqueous medium saturated with carbon dioxide and having a pH within the range of from above 5.5 to about 7.5 and a buffering tgent to maintain the diluter within said range.

References Cited in the file of this patent

UNITED STATES PATENTS 2,598,881    Berliner _____ June 3, 1952

OTHER REFERENCES

Shettles: Proc. Soc. for Exptl. Biol. and Med., vol. 45, No. 1, October 1940, pages 318–322.

Journal of Dairy Science, vol. 37, 1954, page 651.